United States Patent
Liao et al.

(10) Patent No.: US 8,354,998 B2
(45) Date of Patent: Jan. 15, 2013

(54) INFORMATION INPUT PANEL USING LIGHT EMITTED DIODE MATRIX WITH TIME-DIVISION MULTIPLEXING

(75) Inventors: Tung-Tsai Liao, Hsin Chu (TW); Li Sheng Lo, Hsin Chu (TW)

(73) Assignee: Generalplus Technology Inc., Hsinchu (TW)

( * ) Notice: Subject to any disclaimer, the term of this patent is extended or adjusted under 35 U.S.C. 154(b) by 852 days.

(21) Appl. No.: 12/488,122

(22) Filed: Jun. 19, 2009

(65) Prior Publication Data

US 2010/0117958 A1  May 13, 2010

(30) Foreign Application Priority Data

Nov. 11, 2008  (TW) ................. 97143453 A

(51) Int. Cl.
*G06F 3/033* (2006.01)
*G06F 3/041* (2006.01)
*G09G 5/08* (2006.01)
*H05B 37/02* (2006.01)

(52) U.S. Cl. .................. 345/158; 315/149; 345/173

(58) Field of Classification Search .................. None
See application file for complete search history.

(56) References Cited

U.S. PATENT DOCUMENTS

2005/0200293 A1* 9/2005 Naugler et al. ............... 315/149
2009/0256810 A1* 10/2009 Pasquariello ................. 345/173

* cited by examiner

*Primary Examiner* — Alexander S Beck
*Assistant Examiner* — Kirk Hermann
(74) *Attorney, Agent, or Firm* — Muncy, Geissler, Olds & Lowe, PLLC

(57) ABSTRACT

The present invention relates to an information input panel using the light emitted diode (LED) matrix. The panel includes the LED matrix and a control circuit. The LED matrix includes N×M LEDs. The control circuit includes N first terminals and M second terminals, wherein the $i^{th}$ first terminal thereof is coupled to first terminals of the LEDs in the $i^{th}$ row and the $j^{th}$ second terminal thereof is coupled to second terminals of the LEDs in the $j^{th}$ column. In the $k^{th}$ detecting period, the control circuit detects the reverse photoelectric currents of each LED from the second terminals through the $k^{th}$ first terminal to determine whether LED in the $k^{th}$ row is lighted up or not, wherein "M", "N", "i", "j", "k" are nature numbers and $0<i<=M$; $0<j<=N$; $0<k<=M$.

14 Claims, 16 Drawing Sheets

INFORMATION INPUT PANEL USING LIGHT EMITTED DIODE MATRIX WITH TIME-DIVISION MULTIPLEXING

This application claims priority of No. 097143453 filed in Taiwan R.O.C. on Nov. 11, 2008 under 35 USC 119, the entire content of which is hereby incorporated by reference.

BACKGROUND OF THE INVENTION

1. Field of Invention

The present invention relates in general to the light emitted diode (LED) technology, and more particularly to an information input panel using LED matrix.

2. Related Art

Since the beginning of civilization, human record the information by using drawings and characters. As the development of technology, the information recording method of human being is changed from the hand writing by pen and paper to using the computer record. In earlier conventional art, the drawing panel is made of a plastic layer and a tremellose layer. When using an exclusive pen to the drawing panel, the tremellose layer will bind with the plastic layer to generate a pattern by pen point pressure. Another conventional structure of the drawing panel is made of ferruginous powder disposing on the plastic panel with iron net. When a magnetic pen draws on the drawing panel, the plastic panel magnetically pulls the ferruginous powder to show the drawing pattern.

The abovementioned drawing panels have a common advantage, which is reusable. However, the pattern will gradually disappear due to the fadeaway of its stickiness in the drawing panel of the first conventional art. In addition, in the iron powder type drawing panel of the second conventional art, due to the iron powder is been magnetization, it induce that the iron powder is attracted on the iron net. As time passes, the pattern of the drawing panel will become blurring.

The mainstream of the information input and display board is light emitted diode (LED) display, such as an LED display panel on bus or subway, or an LED badge and so on. However, if end user want to modify the display information outputted from the LED display panel, the LED display panel should be connected to a computer, and the specific software in the computer should be used, or the input device of the LED display panel and the built-in fonts of the LED display panel should be utilized to select the output information. Although the outputting figure of the display can be more flexible by using computer, the interconnection with computer and the specific software are prerequisite. On the contrary, by utilizing the built-in fonts, the outputting figure of the display will be relatively limited, so that the outputting figure cannot be modified at will.

SUMMARY OF THE INVENTION

It is therefore an objective of the present invention to provide an information input panel using light emitted diode matrix to facilitate the information input by user and to immediately display the inputted information.

The present invention achieves the above-identified or other objectives by providing an information input panel using light emitted diode matrix, which includes an LED matrix, a plurality of control circuits, wherein the LED matrix includes a plurality of LEDs, and each LED includes a first terminal and a second terminal. A first control terminal of each control circuit is coupled to the first terminal of the corresponding LED, and a second control terminal thereof is coupled to the second terminal of the corresponding LED. In a detecting period, the control circuits provide a reverse bias voltage for a preset period to the first terminal and the second terminal of the LEDs, and then the first terminals of the control circuits is set to a high impedance. Next, each control circuit detects the reverse photoelectric current of the coupled LED to determine whether the corresponding LED is lighted up or not.

The present invention additionally provides an information input panel using light emitted diode matrix. The panel includes an LED matrix, a first switching circuit, a second switching circuit and a control circuit. The LED matrix includes a plurality of LEDs. The first switching circuit includes a first terminal and a plurality of second terminals, wherein the second terminals of the first switching circuit are respectively coupled to the first terminals of the LEDs. The second switching circuit includes a first terminal and a plurality of second terminals, wherein the second terminals of the second switching circuit are respectively coupled to the second terminals of the LEDs. A first control terminal of the control circuit is coupled to the first terminal of the first switching circuit, and a second control terminal thereof is coupled to the first terminal of the second switching circuit. In the $i^{th}$ detecting period, the first terminal of the first switching circuit is electrically connected to the $i^{th}$ second terminal thereof, and the first terminal of the second switching circuit is electrically connected to the $i^{th}$ second terminal thereof. At this time, the control circuit detects the reverse photoelectric current of the coupled $i^{th}$ LED to determine whether the $i^{th}$ LED is lighted up or not, wherein "i" is a nature number.

In the information input panel using light emitted diode matrix according to the preferred embodiment of the present invention, when each first terminal of the LEDs is cathode, and each second terminal of the LEDs is anode, the control circuit includes a tri-state controller, a comparator, a counting circuit and a judging circuit. The tri-state controller is coupled to the first control terminal and the second terminal of the control circuit. In the detecting period, the tri-state controller provides a common voltage to the second control terminal of the control circuit and a power supply voltage to the first terminal of the control circuit for a preset period, and then the tri-state controller set the first control terminal of the control circuit to a high impedance state. The comparator includes a first input terminal, a second input terminal and an output terminal. The first input terminal thereof receives a preset voltage, and the second input terminal thereof is coupled to the first control terminal of the control circuit. In the detecting period, a voltage level of a comparing signal outputted from the output terminal of the comparator is changed from the first saturation voltage to the second saturation voltage when the voltage of the first control terminal of the control circuit is smaller than the preset voltage. The counting circuit is coupled to the output terminal of the comparator. From the beginning of the detecting period, a counting value is accumulated for each preset time. When the voltage level of the comparing signal is changed from the first saturation voltage to the second saturation voltage, the accumulating is stopped and the counting value is outputted. The judging circuit is coupled to the counting circuit for receiving the counting value. When the counting value is smaller than a preset value, the LED is lighted up.

Similarly, when each first terminal of the LEDs is cathode, and each second terminal of the LEDs is anode, the control circuit includes a tri-state controller, an analog-to-digital converter (ADC) and a judging circuit. The tri-state controller is coupled to the first control terminal and the second terminal of the control circuit. In the detecting period, the tri-state controller provides the common voltage to the second control terminal of the control circuit, and the power supply voltage to the first control terminal of the control circuit for a preset period, after that, the tri-state controller set the first control terminal of the control circuit to a high impedance state. The ADC includes an input terminal and an output terminal, wherein the input terminal thereof is coupled to the first control terminal of the control circuit. In the predetermined period before the end of the detecting period, a digital value is outputted by the ADC according to the voltage of the first control terminal of the control circuit. The judging circuit is coupled to the ADC for receiving the digital value. When the digital value is smaller than a preset value, the LED is lighted up.

When each first terminal of the LEDs is anode, and each second terminal of the LEDs is cathode, the control circuit includes a tri-state controller, a comparator, a counting circuit and a judging circuit. The tri-state controller is coupled to the first control terminal and the second control terminal of the control circuit. In the detecting period, the tri-state controller provides a power supply voltage to the second control terminal of the control circuit, and provides a common voltage to the first control terminal of the control circuit for a preset period, after that, the tri-state controller sets the first control terminal of the control circuit to the high impedance. The comparator includes a first input terminal, a second input terminal and an output terminal. The first input terminal thereof receives a preset voltage, and a second input terminal is coupled to the first control terminal of the control circuit. In the detecting period, the voltage level of a comparing signal outputted from the output terminal of the comparator is changed from the first saturation voltage to the second saturation voltage if the voltage of the first control terminal of the control circuit is larger than the preset voltage. The counting circuit is coupled to the output terminal of the comparator. From the beginning of the detecting period, a counting value is accumulated for each preset time until the voltage level of the comparing signal is changed from the first saturation voltage to the second saturation voltage, and then the accumulating is stopped and the accumulated counting value is outputted. The judging circuit is coupled to the counting circuit for receiving the counting value. When the counting value is smaller than a preset value, the LED is lighted up.

Similarly, when each first terminal of the LEDs is anode, and each second terminal of the LEDs is cathode, the control circuit includes a tri-state controller, an analog-to-digital converter (ADC) and a judging circuit. The tri-state controller is coupled to the first control terminal and the second terminal of the control circuit. In the detecting period, the tri-state controller provides the power supply voltage to the second control terminal of the control circuit, and provide the common voltage to the first control terminal of the control circuit for a preset period, after that, the tri-state controller set the first control terminal of the control circuit to the high impedance. The ADC includes an input terminal and an output terminal, wherein the input terminal thereof is coupled to the first control terminal of the control circuit. In the predetermined period before the end of the detecting period, a digital value is outputted by the ADC according to the voltage of the first control terminal of the control circuit. The judging circuit is coupled to the ADC for receiving the digital value. When the digital value is larger than a preset value, the LED is controlled to light up.

The present invention additionally provides an information input panel using a light emitted diode (LED) matrix. The panel includes the LED matrix and a control circuit. The LED matrix includes N×M LEDs, wherein each LED includes a first terminal and a second terminal. The control circuit includes N first control terminals and M second control terminals, wherein the $i^{th}$ first control terminal is coupled to the first terminals of the LEDs in the $i^{th}$ row, the $j^{th}$ second control terminal is coupled to the second terminals of the LEDs in the $j^{th}$ column. In the $k^{th}$ detecting period, the control circuit detects the reverse photoelectric currents flowing from the each of the second control terminal of the control circuit through the M coupled LEDs to the $k^{th}$ first control terminal of the control circuit to determine whether LED in the $k^{th}$ row is lighted up. When the reverse photoelectric current of the specific LED in the $k^{th}$ row is larger than a predetermined value, the specific LED is lighted up. Wherein "M", "N", "i", "j", "k" are nature numbers and $0<i<=M$, $0<j<=N$, $0<k<=M_o$ In the information input panel using light emitted diode matrix according to the preferred embodiment of the present invention, when the first terminal of each LED is cathode, and the second terminal of each LED is anode, the control circuit includes a horizontal control circuit, a vertical control circuit and M current detecting circuits. The horizontal control circuit includes the N first control terminals. The vertical control circuit includes the M second control terminals. In the $k^{th}$ detecting period, the $k^{th}$ first control terminal of the horizontal control circuit is set to a power supply voltage, the M second control terminals of the vertical control circuit is set to a common voltage for a preset period, and then to a high impedance state. After that, the $p^{th}$ current detecting circuit determines the reverse photoelectric current of the $p^{th}$ LED in the $k^{th}$ row according to the variation of a terminal voltage of the $p^{th}$ second control terminal with respect to time. If the reverse photoelectric current of the $p^{th}$ LED in the $k^{th}$ row is larger than the preset value, in the $k^{th}$ lightened period, the $k^{th}$ first control terminal of the horizontal control circuit is set to the common voltage, and the $p^{th}$ second control terminal is set to the power supply voltage to light up the $p^{th}$ LED in the $k^{th}$ row, wherein "p" is a nature number.

Similarly, if the first terminal of each LED is anode, the second terminal of the LED is cathodes, and the control circuit includes a horizontal control circuit, a vertical control circuit and M current detecting circuits. However, the difference is as follows. In the $k^{th}$ detecting period, the $k^{th}$ first control terminal of the horizontal control circuit is set to a common voltage, the M second terminals are set to a power supply voltage for a preset period, and then to a high impedance state. After that, the $p^{th}$ current detecting circuit determines the reverse photoelectric current of $p^{th}$ LED in the $k^{th}$ row according to the variation of a terminal voltage of the $p^{th}$ second control terminal with respect to time. If the reverse photoelectric current of the $p^{th}$ LED in the $k^{th}$ row is larger than the preset value, in the $k^{th}$ lightened period, the $k^{th}$ first control terminal of the horizontal control circuit is set to the power supply voltage, and the $p^{th}$ second control terminal is set to the common voltage to light up the $p^{th}$ LED in the $k^{th}$ row.

The spirit of the present invention is to utilize the LED matrix to be a display device and an input device. In other words, end user can directly input information through a laser pen or another light emitting element to the LED matrix. The major principle of the present invention is to apply the photoelectric effect, which make the reverse photoelectric current be generated when the LED receives light, for detecting the light source. Therefore, the present invention at least has the advantages of:

1. reducing the complication of data input;
 2. freeing from additional optical sensing element;
 3. being adapted for a novice and a child to use;
 4. showing the result immediately after input; and
 5. freeing from the computer as the medium interface.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 1:
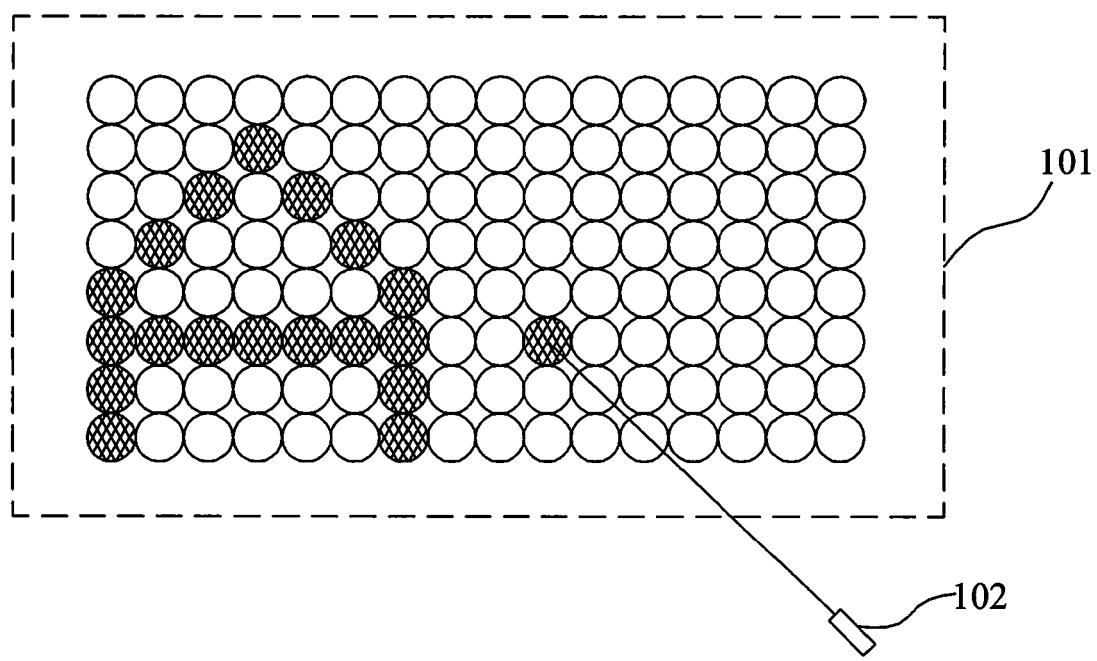
FIG. 1 is a block diagram showing an information input panel of a light emitted diode (LED) matrix according to an embodiment of the present invention.

FIG. 1 is a block diagram showing an information input panel of a light emitted diode (LED) matrix according to an embodiment of the present invention. Referring to FIG. 1, the design of the information input panel is to utilize a laser pen 102 or a resembling light emitted device to directly draw on the LED matrix 101 for performing the information input. In order to make one of ordinary skill in the art to implement the present invention, the following embodiments are provided to illustrate the spirit of the invention.

Figure 2:
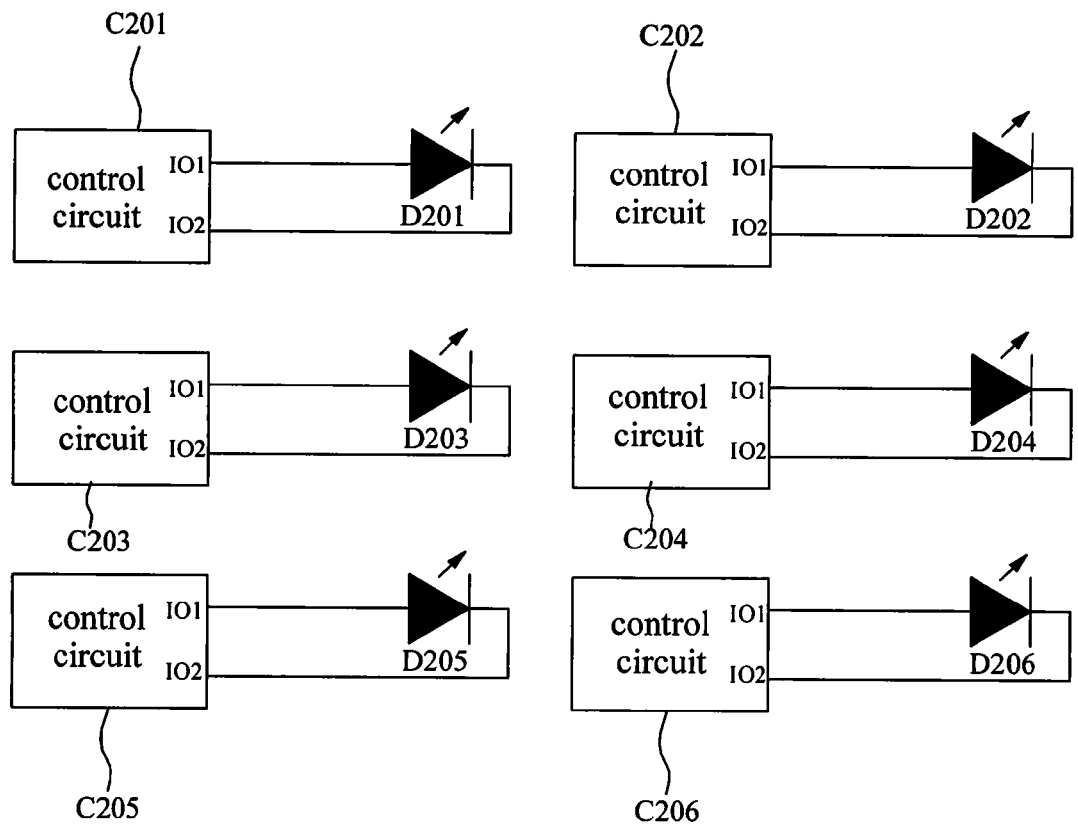
FIG. 2 is a circuit block diagram showing an information input panel of a LED matrix according to an embodiment of the present invention.

FIG. 2 is a circuit block diagram showing an information input panel of a LED matrix according to an embodiment of the present invention. Referring to FIG. 2, the embodiment uses six LED D201~D206 to be an example. In this embodiment, each LED D201~D206 is assigned to a corresponding control circuit for detecting the reverse photoelectric current of the coupled LED D201~D206 to determine whether the coupled LED D201~D206 is lighted up or not. The detail circuit of the control circuit C201~C206 will be described on the following. The further details are omitted at this paragraph.

Figure 3:
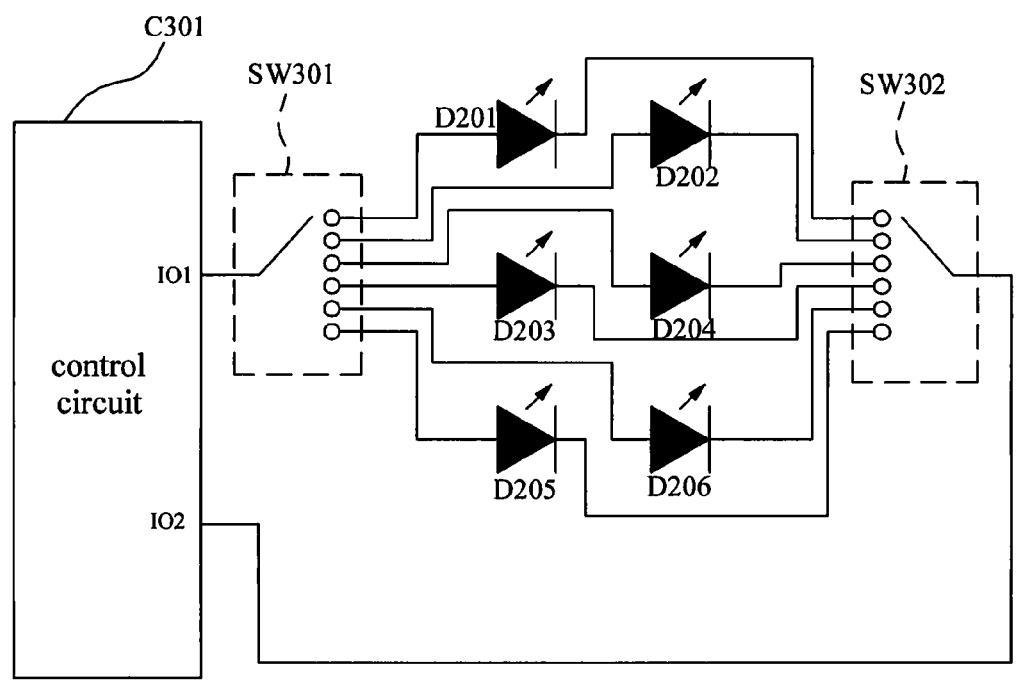
FIG. 3 is a circuit block diagram showing an information input panel of a LED matrix according to another embodiment of the present invention.

FIG. 3 is a circuit block diagram showing an information input panel of a LED matrix according to another embodiment of the present invention. Referring to FIG. 3, similarly, for convenience of the explanation, the information input panel in this embodiment uses six LEDs D201~D206 to be an example. In particular, only one control circuit C301 is provided for control the LEDs D201~D206. The control method thereof is to utilize the switching circuits SW301 and SW302 to sequentially switch with time to determine which the LED D201~D206 is coupled to the control circuit C301. During a first period, two control terminal IO1 and IO2 of the control circuit C301 are respectively coupled to the two terminal of the LED D201 to detect the reverse photoelectric current of the LED D201; during a second period, the two control terminal IO1 and IO2 of the control circuit C301 are respectively coupled to the two terminal of the LED D202 to detect the reverse photoelectric current of the LED D202 . . . and so on. The control mechanism of the information input panel using LED matrix is to utilize the concept of the Time Division Multiplexing (TDM).

Figure 4A:
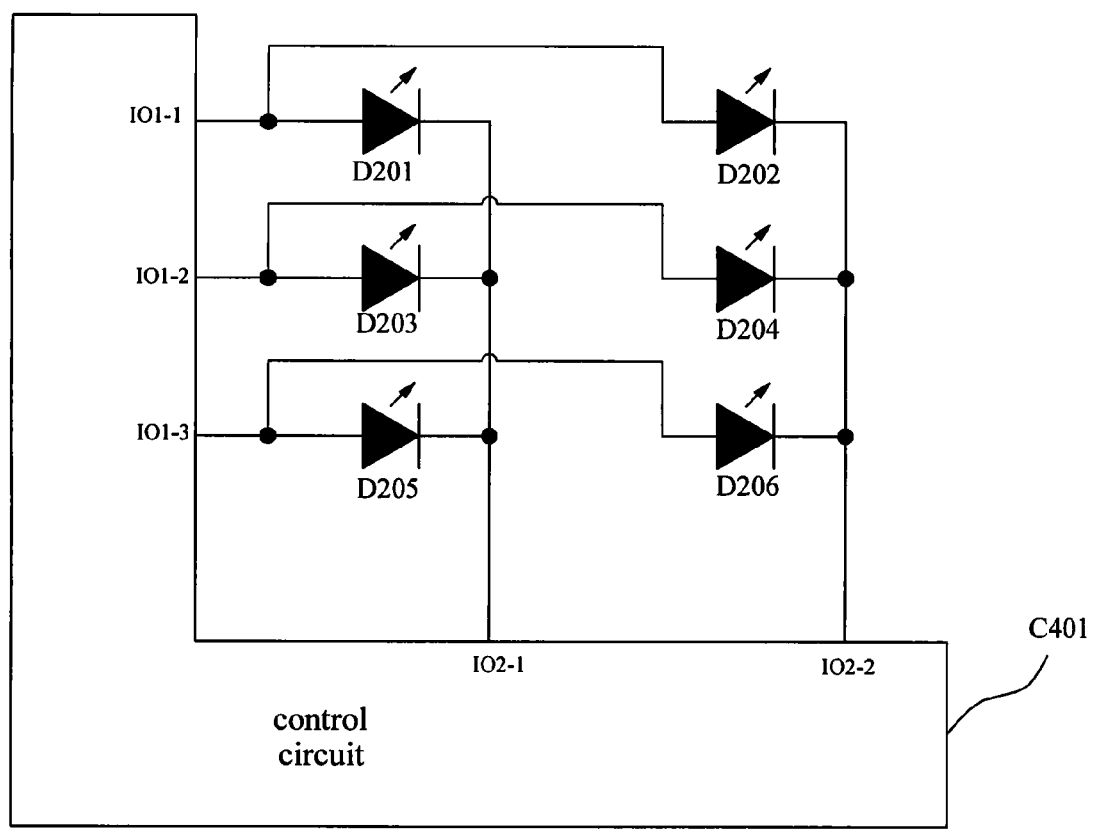
FIG. 4A is a circuit block diagram showing an information input panel of a LED matrix according to the other embodiment of the present invention.

FIG. 4A is a circuit block diagram showing an information input panel of a LED matrix according to the other embodiment of the present invention. Referring to FIG. 4A, the information input panel of the embodiment is to utilize six LEDs D201~D206 as an example as well. In particular, the design of the information input panel in this embodiment is to utilize a concept of an array. In other words, the six LEDs D201~D206 can be regarded as a 2×3 matrix. The anodes of the LEDs in each row are respectively coupled to the horizontal control terminals IO1-1, IO1-2 and IO1-3 of the control C401 and the cathodes of the LEDs in each column are respectively coupled to the vertical control terminals IO2-1 and IO2-2 of the control C401. Similarly, the design of the circuit in this embodiment still utilizes the concept of TDM. For example, during a first period, the control circuit C401 enables the terminals IO1-1, IO2-1 and IO2-2 for detecting the reverse photoelectric currents of the LED D201 and D202; during a second period, the control circuit C401 enable the terminals IO1-2, IO2-1 and IO2-2 for detecting the reverse photoelectric currents of the LED D203 and D204; during a third period, the control circuit C401 enable the terminals IO1-3, IO2-1 and IO2-2 for detecting the reverse photoelectric currents of the LED D205 and D206.

Figure 4B:
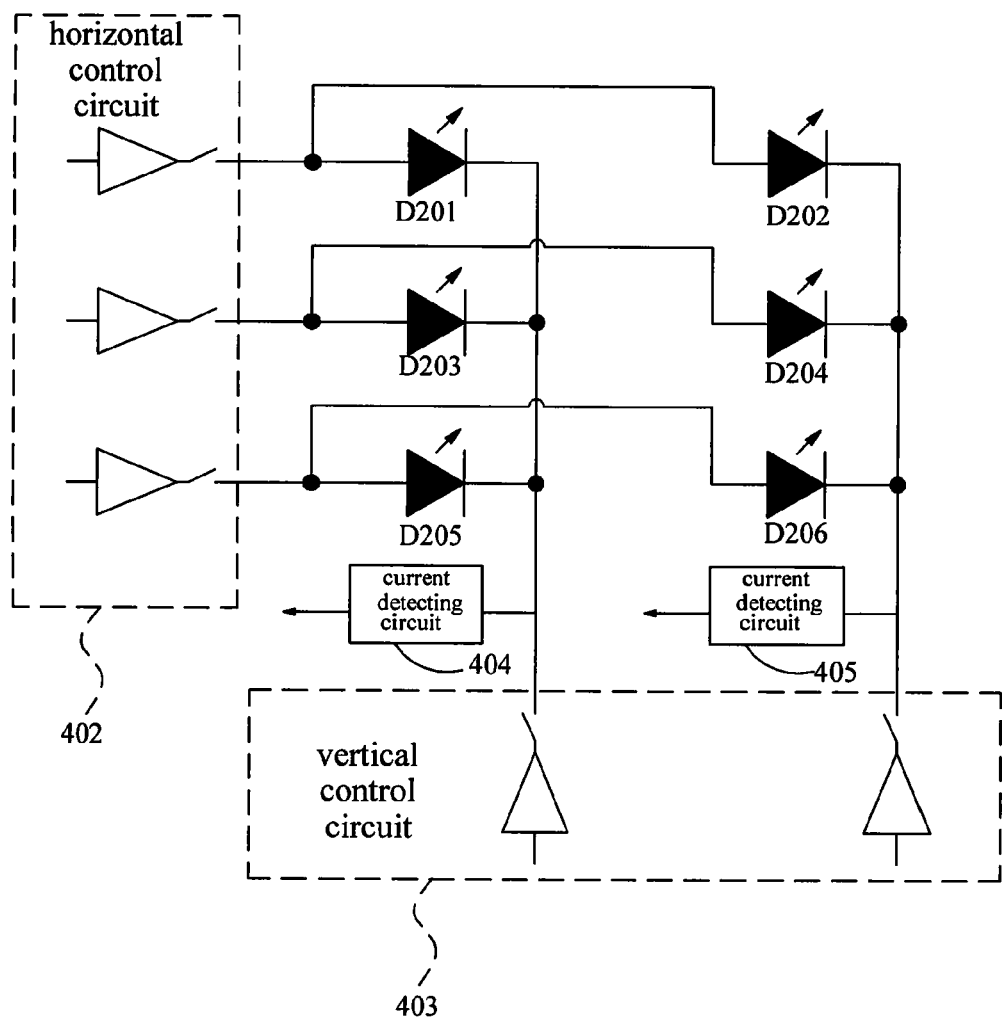
FIG. 4B is a detail circuit block diagram showing an information input panel of a LED matrix according to FIG. 4A of an embodiment of the present invention.

FIG. 4B is a detail circuit block diagram showing an information input panel of an LED matrix according to FIG. 4A of an embodiment of the present invention. Referring to FIG. 4B, the control circuit in this embodiment is separated into a horizontal control circuit 402, a vertical control circuit 403 and the current detecting circuits 404~405. The current detecting circuits 404~405 are only coupled to the vertical control circuit 403. In addition, the terminals of the horizontal control circuit 402 and the vertical control circuit 403 respectively have tri-state function. In order to illustrate the principle of the detection of the reverse photoelectric current of the LED(s) D201~D206 by the control circuit C301, C201~C206 or the current detecting circuits 404~405, the following paragraph in corporation with a voltage waveform with respect to time when the LED is in a reverse bias is provided to illustrate.

Figure 5A:
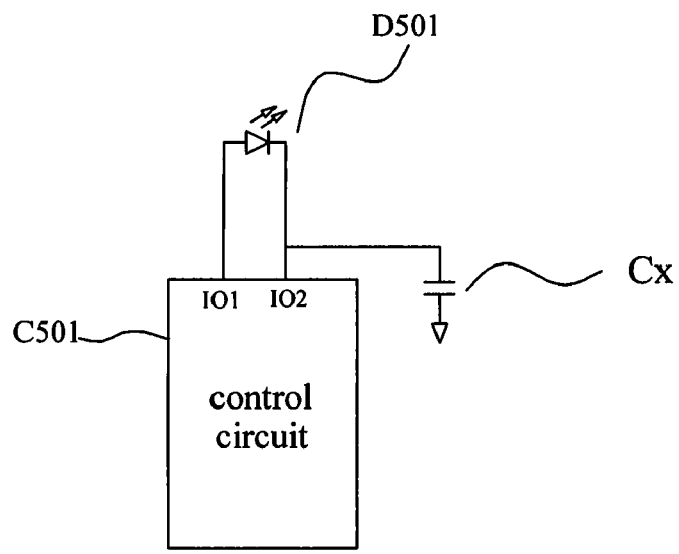
FIG. 5A is a circuit block diagram for experimentation of a photoelectric effect when the LED is in a reverse bias according to an embodiment of the present invention.

FIG. 5A is a circuit block diagram for experimentation of a photoelectric effect when the LED is in a reverse bias according to an embodiment of the present invention. Referring to FIG. 5A, in this experiment, the control terminal IO2 of the control circuit C501 provides a power supply voltage to the cathode of the LED D501, and the control terminal IO1 of the control circuit C501 provides the ground voltage GND to the anode of the LED D501. After that, the control terminal IO2 of the control circuit C501 is set to a tri-state, that is, a high impedance state. Since the LED D501 is in the reverse bias, there is a little photoelectric current flowing through the LED D501 when the LED D501 is illuminated. In addition, a stray capacitance Cx will be generated in the circuit layout of the D501, so that the stray capacitance Cx will be slowly discharged. The voltage of the cathode of the LED D501 will be reduced. Certainly, if the stray capacitance Cx is replaced by a general capacitor, the stabilization of the operation of the circuit will be raised.

Figure 5B:
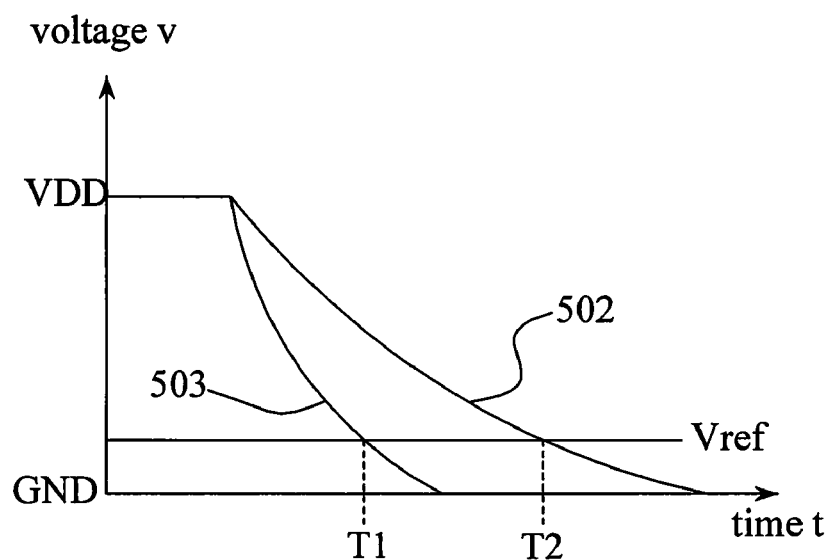
FIG. 5B is a charging and discharging waveform showing a photoelectric effect when the LED is in a reverse bias according to FIG. 5A of an embodiment of the present invention.

FIG. 5B is a charging and discharging waveform showing a photoelectric effect when the LED is in a reverse bias according to FIG. 5A of an embodiment of the present invention. Referring to FIG. 5A and FIG. 5B, the waveform 502 is a discharging waveform of the LED D501 when no light source approaches the LED 501; the waveform 503 is a discharging waveform when a light source approaches the LED D501. In observation on the waveforms, it should be known that the photoelectric current is generated when the LED D501 receives the illumination of a light source, and the more the intensity of illumination of a light source is received by the LED D501, the larger the value of the photoelectric current is generated. Thus, the discharging rate of the stray capacitance Cx is raised. In observation on the waveform 502, it should be known that the discharging rate of the stray capacitance Cx is smaller since the LED D501 did not receive the illumination of a light source.

From the abovementioned waveforms 502 and 503, it should be known that the reverse photoelectric current of the LED D501 is in direct proportion to the variation of the voltage of the cathode of the LED D501 with respect to time. As long as the voltage of the cathode of the LED D501 is continuously detected, the reverse photoelectric current of the LED D501 can be determined so that whether a light source is closed to the LED D501 can be detected. Therefore, in the design of the abovementioned control circuits C301, C201~C206 or the current detecting circuits 404~405, a preset reference voltage Vref can be set therein, wherein the preset reference voltage Vref is between the power supply voltage VDD and the ground voltage GND. As long as the control circuits C301, C201~C206 or the current detecting circuit 404 calculates the period during which the voltage of the cathode of the LED is discharged from the power supply voltage to the preset reference voltage, whether a light source is closed to the LED D501 can be determined.

Thus, in the abovementioned embodiments, when the control circuits C301, C201~C206 detect the reverse photoelectric current of the LED, they supply the detected LED a reverse bias for a preset period so that the stray capacitance Cx is charged. After that, the control circuits C301, C201~C206 determine whether the detected LED receives the illumination of a light source according to the period during which the voltage of the cathode of the detected LED reaches the preset reference voltage Vref so that whether a forward bias is provided to the detected LED can be determined. When the period during which the voltage of the cathode of the detected LED reaches the preset reference voltage Vref is shorter than T2, it represent that the detected LED is illuminated by a light source, at this time, the forward bias can be provided to the detected LED to light it up.

In addition, the abovementioned waveforms had already and clearly described that discharging time of the capacitor Cx relates to the intensity of the illumination of a light source. However, in the design stage, if it is only consider that the abovementioned control circuits C301, C201~C206 or the abovementioned current detecting circuits 404~405 are used for counting the period during which the voltage of the cathode of the LED is discharged from the power supply voltage to the preset reference voltage, the detecting period will be prolonged, and the response time of the entire circuit will be negatively affected as well. Therefore, the control strategy of the control circuits C301, C201~C206 or the current detecting circuits 404~405 can be to set a preset time Tpre therein. When the preset time Tpre expires from the beginning of the detecting period, the voltage of the capacitor Cx is not lower than the abovementioned reference voltage Vref, it represents that the coupled LED does not receives the illumination of a light source. In accordance with such design, the detecting period can be fixed. Therefore, the detecting speed of the TDM system, such as the circuit on FIG. 3, FIG. 4A or FIG. 4B, will be increased.

Figure 6:
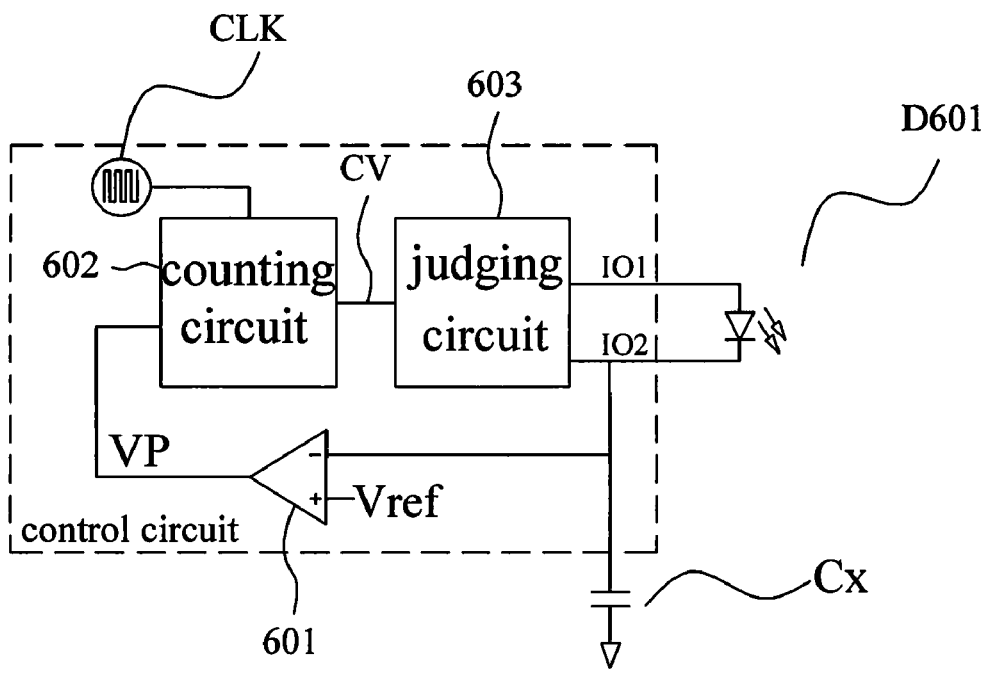
FIG. 6 is a detail circuit block diagram showing the control circuit C201~C206 on FIG. 2 according to an embodiment of the present invention.

FIG. 6 is a detail circuit block diagram showing the control circuit C201~C206 on FIG. 2 according to an embodiment of the present invention. Referring to FIG. 6, in this embodiment, the control circuit includes a comparator 601, a counting circuit 602, a judging circuit 603 and a capacitor Cx. The positive terminal of the comparator 601 receives the preset reference voltage Vref, and the negative terminal of the comparator 601 is coupled to the control terminal IO2 of the control circuit. The capacitor Cx may be the stray capacitance induced by the cathode of the LED D601 to ground or an additional capacitor.

Before the detection, the capacitor Cx will be charged to the power supply voltage. When the detection is beginning, the electric charge on the capacitor Cx is discharged to the control terminal IO1 through the LED D601. At this time, the comparing signal VP outputted from the output terminal of the comparator 601 is a negative saturation voltage. When the capacitor Cx is discharged to a voltage lower than the preset reference voltage Vref, the voltage of the control terminal IO2, that is, the voltage of the negative terminal of the comparator 601, is smaller than the preset reference voltage Vref on the positive terminal of the comparator 601 so that the comparing signal VP outputted from the output terminal of the comparator 601 is a positive saturation voltage. From the beginning of the detecting period, the counting circuit accumulates a counting value CV for each preset time, that is, for each clock period CLK. When the voltage of the comparing signal VP outputted from the output terminal of the comparator 601 is changed from the negative saturation voltage to the positive saturation voltage, the accumulating is stopped and the accumulated counting value CV is outputted. According to the foregoing embodiment, in fact, the counting value CV represents the discharging time during which the voltage of the cathode of the LED D601 is discharged from the power supply voltage VDD to the preset reference voltage Vref. When the discharging time becomes shorter, it represents that the LED D601 received the illumination of a light source, and the outputted counting value CV is smaller. When the discharging time becomes longer, it represents that the LED D601 did not receive the illumination of a light source, and the outputted counting value CV is larger. The judging circuit 603 receives the counting value CV. When the counting value CV is smaller than a preset value, it represents that the LED D601 received the illumination of a light source, and the judging circuit 603 controls the LED D601 to light up.

Figure 7:
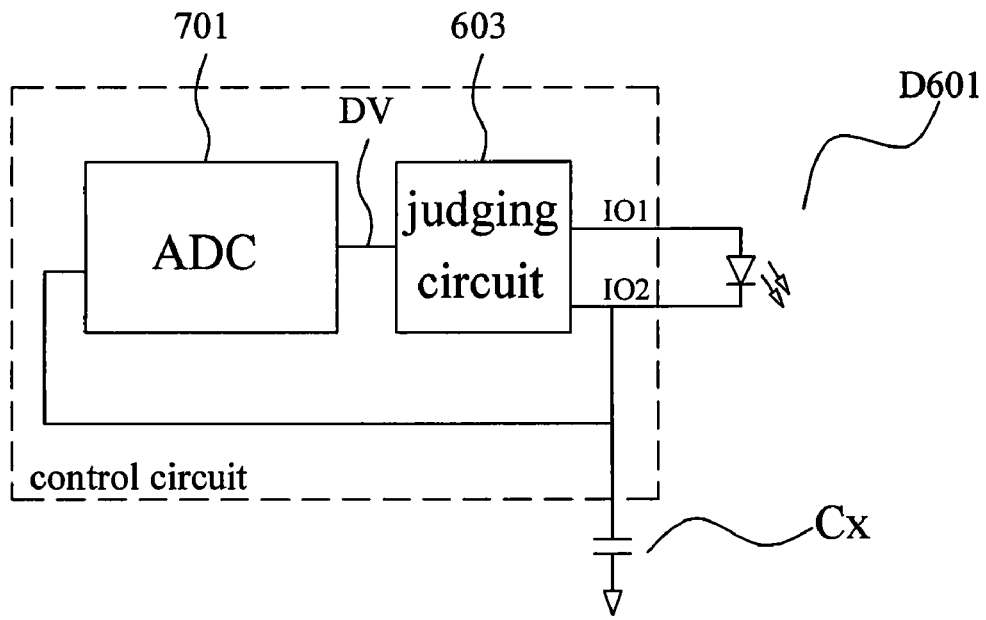
FIG. 7 is another detail circuit block diagram showing the control circuit C201~C206 on FIG. 2 according to an embodiment of the present invention.
Figure 8:
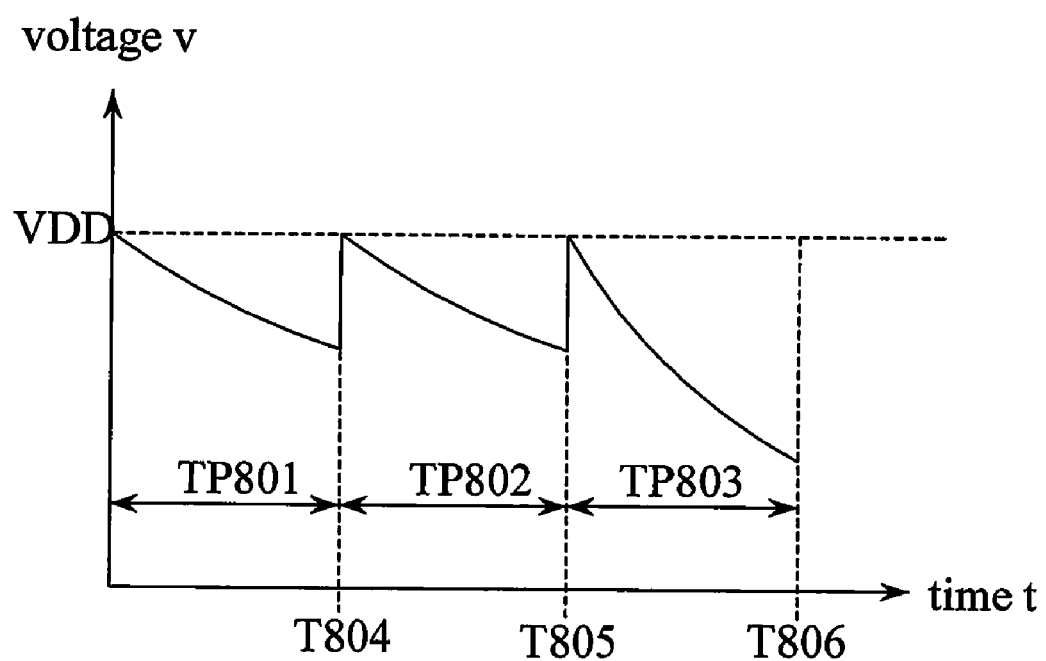
FIG. 8 is a voltage waveform of the control terminal IO2 in FIG. 7 according to an embodiment of the present invention.

FIG. 7 is another detail circuit block diagram showing the control circuit C201~C206 on FIG. 2 according to an embodiment of the present invention. Referring to FIG. 7, the difference between the embodiment of FIG. 7 and the embodiment of FIG. 6 is that the comparator 601 and the counting circuit 602 are replaced by an analog-to-digital converter (ADC) 701. FIG. 8 is a voltage waveform of the control terminal IO2 in FIG. 7 according to an embodiment of the present invention. Referring to FIG. 7 and FIG. 8, in this embodiment, each of the periods TP801, TP802 and TP803 are equal. The period TP801 and the period TP802 are the period during which the LED D601 did not receive the illumination of a light source. The period T803 is the period during which the LED D601 received the illumination of a light source. According to the abovementioned waveforms, it can be regard that if the periods are equal, the final storing charge of the capacitor Cx as well as the voltage of the control terminal IO2 would be influenced by whether the LED D601 received the illumination of a light source. The ADC 701 samples the voltage of the control terminal IO2 at each final time T804, T805 and T806 of the period TP801, TP802 and TP803 and transfers the sampled voltage of the control terminal IO2 to a digital value DV. Generally speaking, the higher the voltage is sampled by the ADC 701, the larger the digital value DV is outputted. Therefore, when the LED D601 receives the illumination of a light source, the digital value DV will apparently become smaller. In this embodiment, the judging circuit 603 stores a preset value. When the received digital value DV is smaller than the preset value, it represents that the LED D601 received the illumination of a light source, so that the judging circuit 603 thus controls the LED D601 to light up.

Figure 9A:
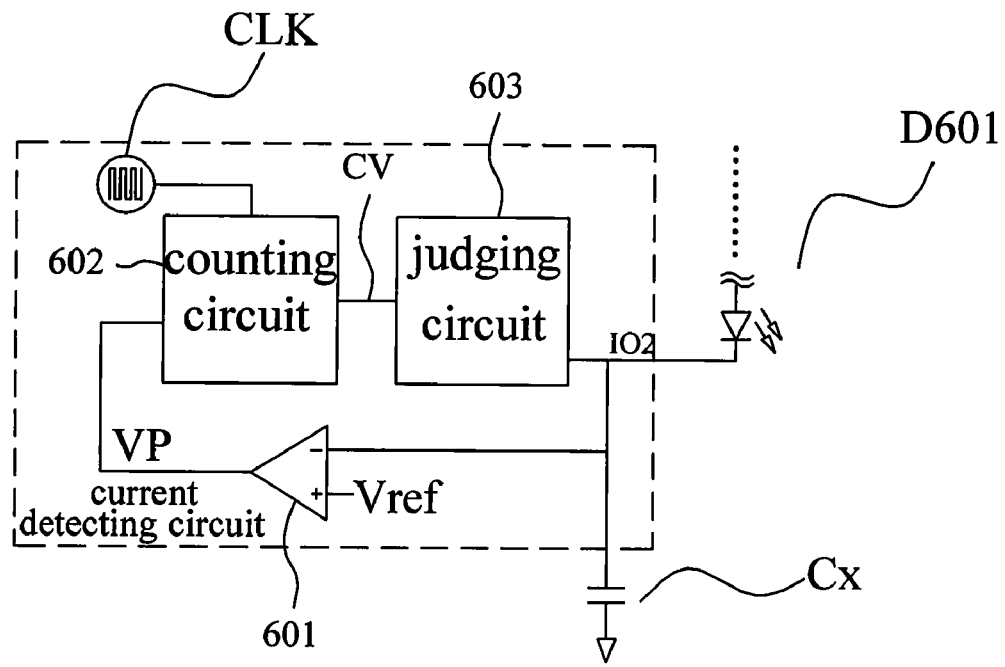
FIG. 9A and FIG. 9B respectively are the detail circuit block diagrams showing the current detecting circuit 404~405 on FIG. 4B according to an embodiment of the present invention.
Figure 9B:
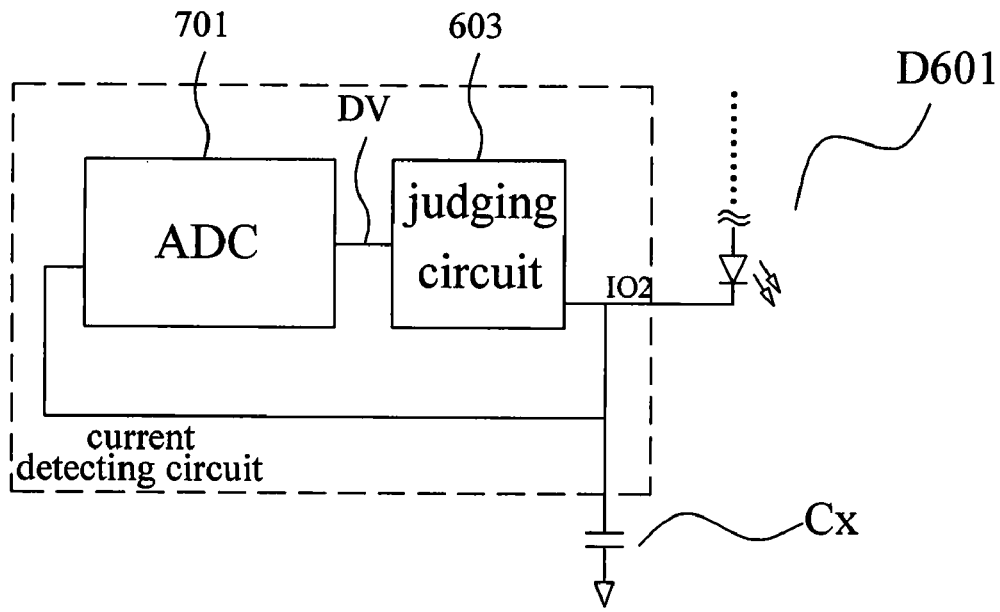

In abovementioned embodiment, one of ordinary skill in the art should know that if the positive terminal of the comparator 601 is exchanged with the negative terminal thereof in other design, the only difference is that the voltage of the comparing signal VP is changed from the original positive (negative) saturation voltage to the negative (positive) saturation voltage. Thus, as long as the requirement for stopping the accumulating of the counting circuit 602 is transformed into the condition when the voltage of the comparing signal VP is changed from the positive saturation voltage to the negative saturation voltage, the operation of the above embodiment is the same. Such the abovementioned design is only an option on design, so the description is omitted. In addition, the circuit diagrams on the FIG. 6 and FIG. 7 in the abovementioned embodiment is for the detail illustration on the control circuit C201~C206. However, one of the ordinary skill in the art should know that the circuit on the FIG. 6 or FIG. 7 can be applied to the control circuit C301 on FIG. 3 or the current detecting circuits 404~405 on FIG. 4B. FIG. 9A and FIG. 9B respectively are the detail circuit block diagrams showing the current detecting circuit 404~405 on FIG. 4B according to an embodiment of the present invention. Referring to FIGS. 9A and 9B, the operating concept of both of the circuits is the same as that of both of the circuits on FIG. 6 and FIG. 7. However, the difference is the judging circuit 603 is used for determining the value of the reverse photoelectric current according to the counting value CV on FIG. 9A or the digital value DV on FIG. 9B. Since the abovementioned embodiments already completely describes the principle of the detection of the reverse photoelectric current of the LED so that the description is omitted.

Figure 10:
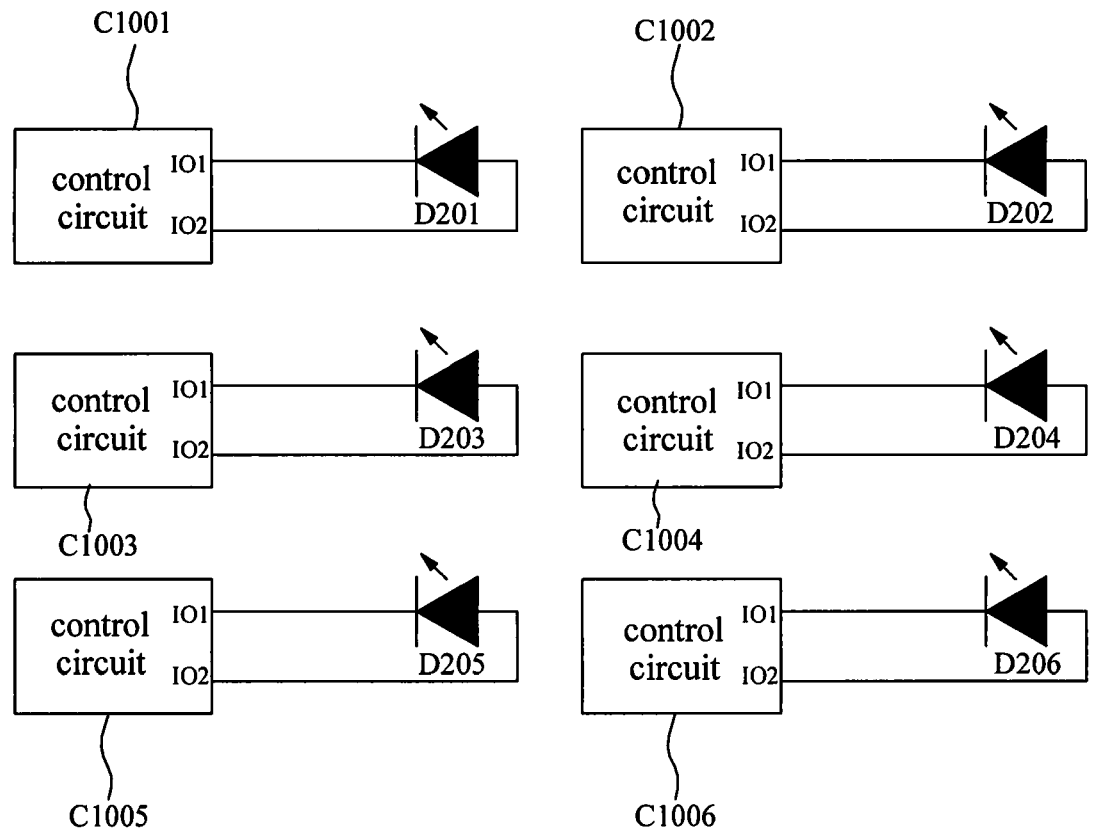
FIG. 10 is a circuit block diagram showing an information input panel of an LED matrix according to an embodiment of the present invention.
Figure 11:
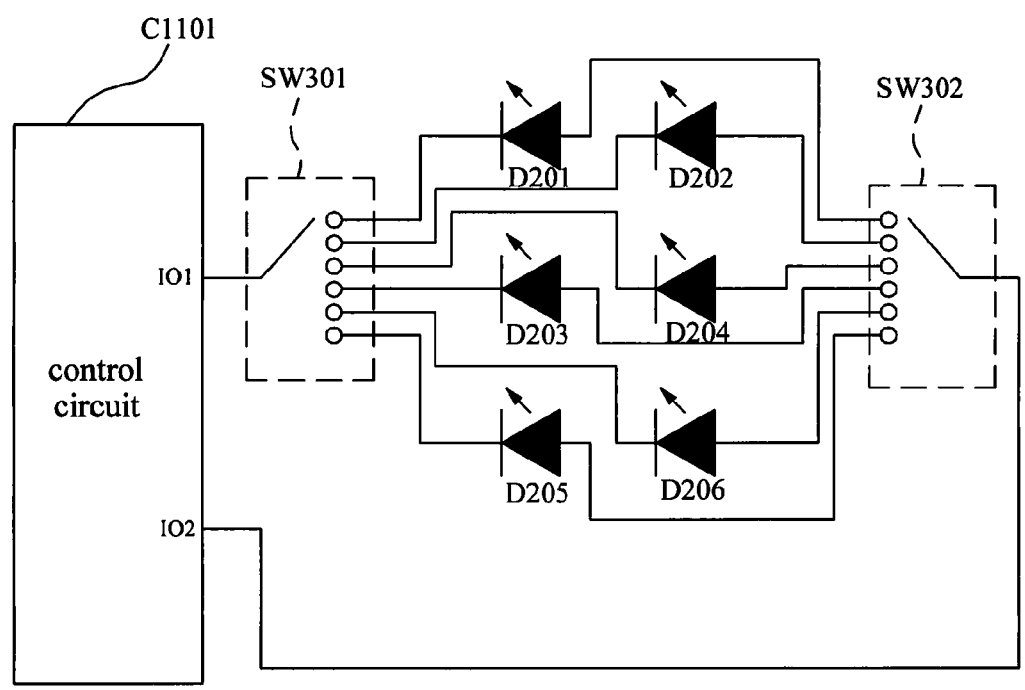
FIG. 11 is a circuit block diagram showing an information input panel of an LED matrix according to an embodiment of the present invention.
Figure 12:
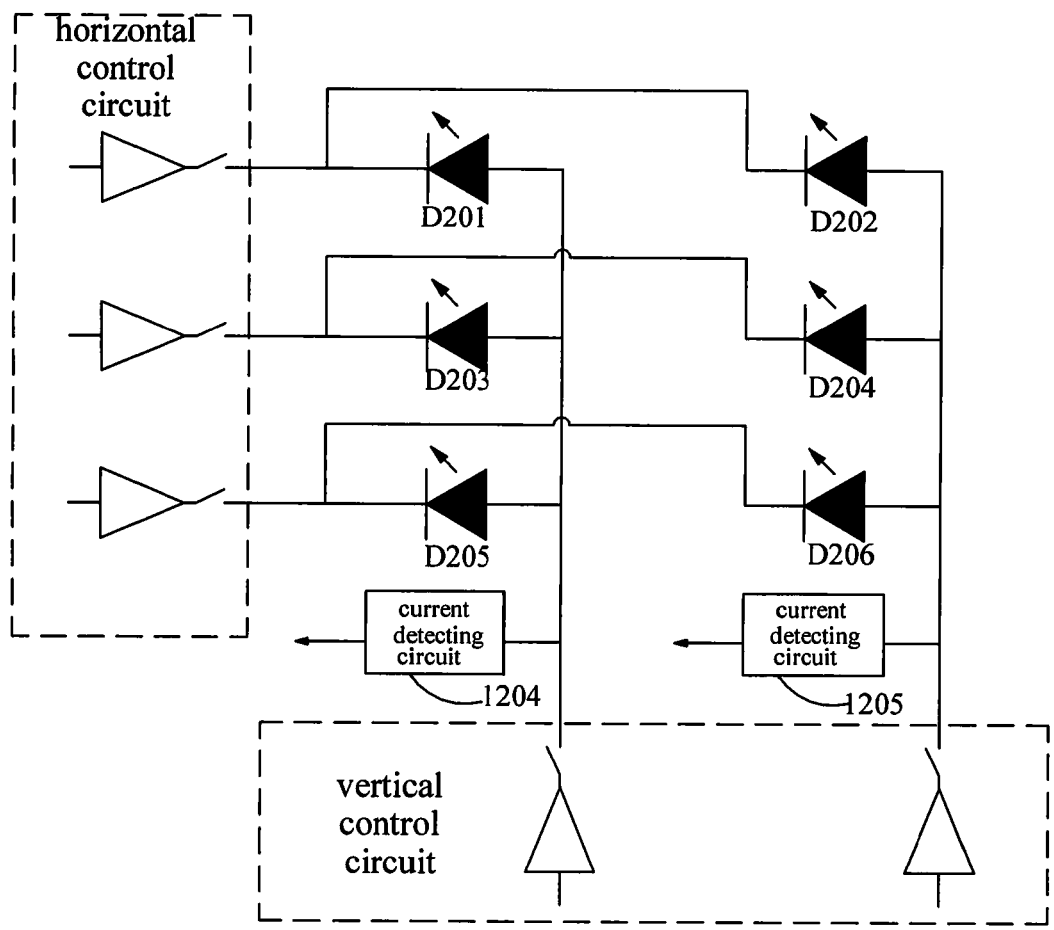
FIG. 12 is a circuit block diagram showing an information input panel of an LED matrix according to an embodiment of the present invention.

The abovementioned embodiments describe to detect the reverse photoelectric current based on the voltage of the cathode of the LED. Hereinafter, the LED is disposed on reverse direction to be an example so that one of ordinary skill in the art can use a different method to implement according to the present invention. FIG. 10 is a circuit block diagram showing an information input panel of an LED matrix according to an embodiment of the present invention. FIG. 11 is a circuit block diagram showing an information input panel of an LED matrix according to an embodiment of the present invention. FIG. 12 is a circuit block diagram showing an information input panel of an LED matrix according to an embodiment of the present invention. Referring to FIG. 10, FIG. 11 and FIG. 12, it is easy to realize that the difference between the configuration of the circuits on FIG. 10, FIG. 11 and FIG. 12 and the configuration of the circuits on FIG. 3 and FIG. 4B is only the inverse coupling on the cathode terminal and the anode terminal of the LEDs D201~D206. Thus, the detection of the reverse photoelectric current of the LEDs D201~D206 depends on the anode terminals of the LEDs D201~D206. The circuit for detection of the reverse photoelectric current by the anodes of the LEDs D201~D206 is provided to be an example so that one of ordinary skill in the art can implement the abovementioned circuit according to the spirit of the invention.

Figure 13A:
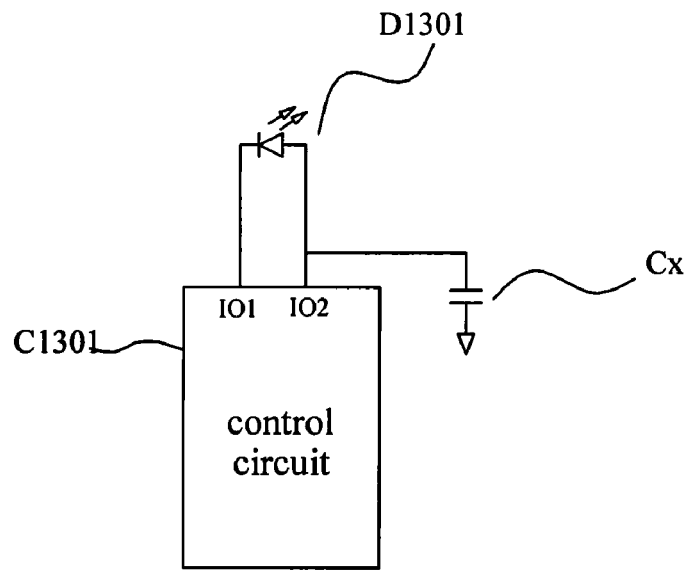
FIG. 13A is a circuit block diagram for experimentation of an photoelectric effect when the LED is in a reverse bias according to an embodiment of the present invention.
Figure 13B:
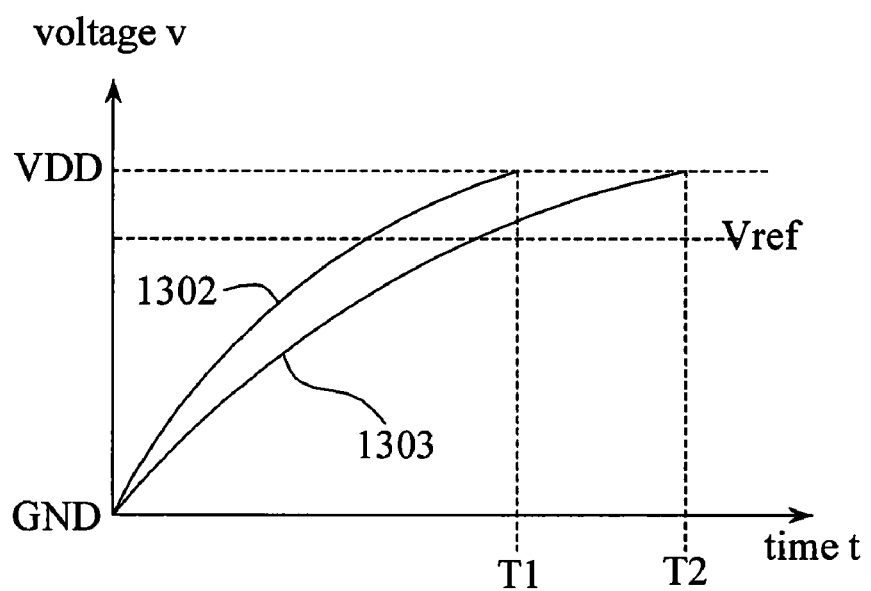
FIG. 13B is a charging and discharging waveform showing an photoelectric effect when the LED is in a reverse bias according to FIG. 13A of an embodiment of the present invention.

FIG. 13A is a circuit block diagram for experimentation of a photoelectric effect when the LED is in a reverse bias according to an embodiment of the present invention. FIG. 13B is a charging and discharging waveform showing a photoelectric effect when the LED is in a reverse bias according to FIG. 13A of an embodiment of the present invention. Referring to FIG. 13A and FIG. 13B, when the cathode of the LED D1301 is coupled to the control terminal IO1, and the anode of the LED D1301 is coupled to the control terminal IO2, the control procedure of the control circuit 1301 comprises the following steps. In step 1, the control terminal IO1 supplies the power supply voltage VDD. In step 2, the control terminal IO2 supplies the ground voltage GND and then the control terminal IO2 is set to a high impedance state. In step 3, a detection is performed, wherein the voltage waveform diagram of the control terminal IO2 is shown as FIG. 13B. The waveform 1302 is a voltage of the control terminal IO2 with respect to time when the LED D1301 received the illumination of a light source. The waveform 1303 is a voltage of the control terminal IO2 with respect to time when the LED D1301 did not receive the illumination of a light source. In the waveforms 1302 and 1303, it can be observed that when the LED D1301 received the illumination of a light source, the reverse photoelectric current is increased so that the charging speed of the capacitor Cx is increased.

Figure 14:
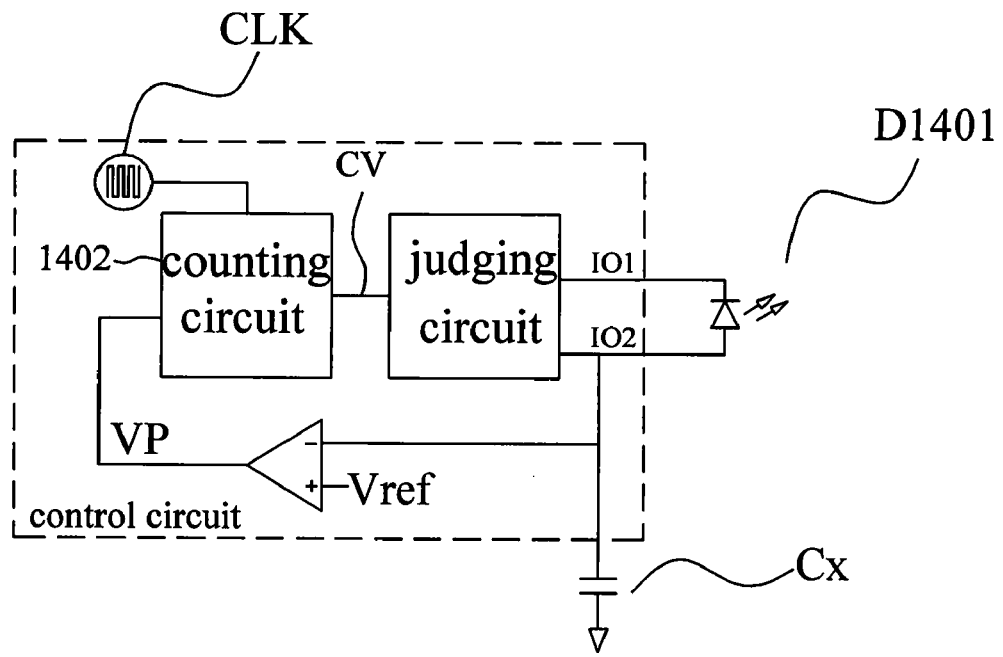
FIG. 14 is a detail circuit block diagram showing the control circuit C1001~C1006 on FIG. 10 according to an embodiment of the present invention.

FIG. 14 is a detail circuit block diagram showing the control circuit C1001~C1006 on FIG. 10 according to an embodiment of the present invention. Referring to FIG. 6 and FIG. 14, the difference between the two circuits is that the coupling of the LED D1401 in FIG. 14 is opposite to that of the LED D601 in FIG. 6. Thus, when the detection is performed, the capacitor Cx is discharged to the ground voltage, after that, the control terminal IO1 continuously supplies the power supply voltage VDD so that the capacitor Cx is charged. When the voltage of the control terminal IO2 is charged to the preset reference voltage Vref, the voltage of the comparing signal VP is changed from the positive saturation voltage to the negative saturation voltage, and the accumulating is stopped by the counting circuit 1401. The operating principle of the control circuit in FIG. 14 is similar to that of the control circuit in FIG. 6, so that the detail description is omitted.

Figure 15:
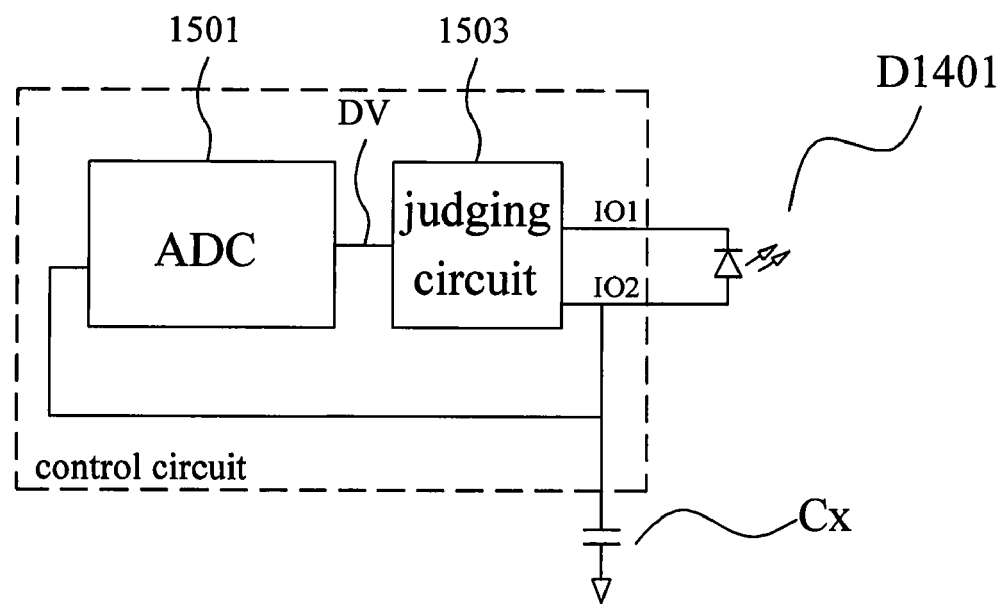
FIG. 15 is another detail circuit block diagram showing the control circuit C1001~C1006 on FIG. 10 according to an embodiment of the present invention.
Figure 16:
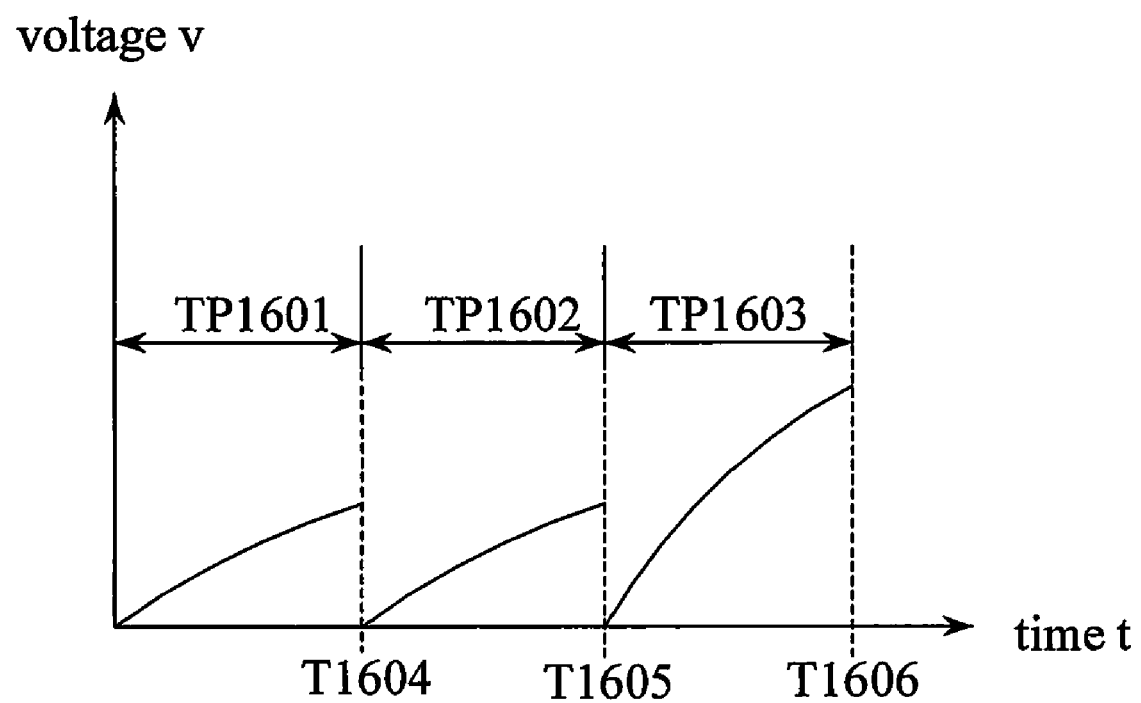
FIG. 16 is a voltage waveform of the control terminal IO2 in FIG. 15 according to an embodiment of the present invention.

FIG. 15 is another detail circuit block diagram showing the control circuit C1001~C1006 on FIG. 10 according to an embodiment of the present invention. FIG. 16 is a voltage waveform of the control terminal IO2 in FIG. 15 according to an embodiment of the present invention. Referring to FIG. 15, FIG. 7, FIG. 16 and FIG. 8, similarly, the difference between the circuits on FIG. 15 and FIG. 7 is that the coupling of the LED D1401 on FIG. 15 is opposite to the coupling of the LED D601 on FIG. 7. Similarly, in the periods TP1601 and TP1602, the LED D1401 did not receive the illumination of a light source, the charging speed of control terminal IO2 is slower so that the measured voltage on the control terminal IO2 at the time point T1604 and T1605 is smaller, and the outputted digital value DV of the ADC 1501 is smaller. At this time, the judging circuit 1503 did not light up the LED D1401. In the period T1603, the LED received the illumination of a light source, the charging speed of the control terminal IO2 is faster so that the measured voltage of the control terminal IO2 at the time point T1606 is larger, and the outputted digital value DV of the ADC 1051 is relatively larger. At this time, the judging circuit 1503 is triggered to light up the LED D1401.

Figure 17A:
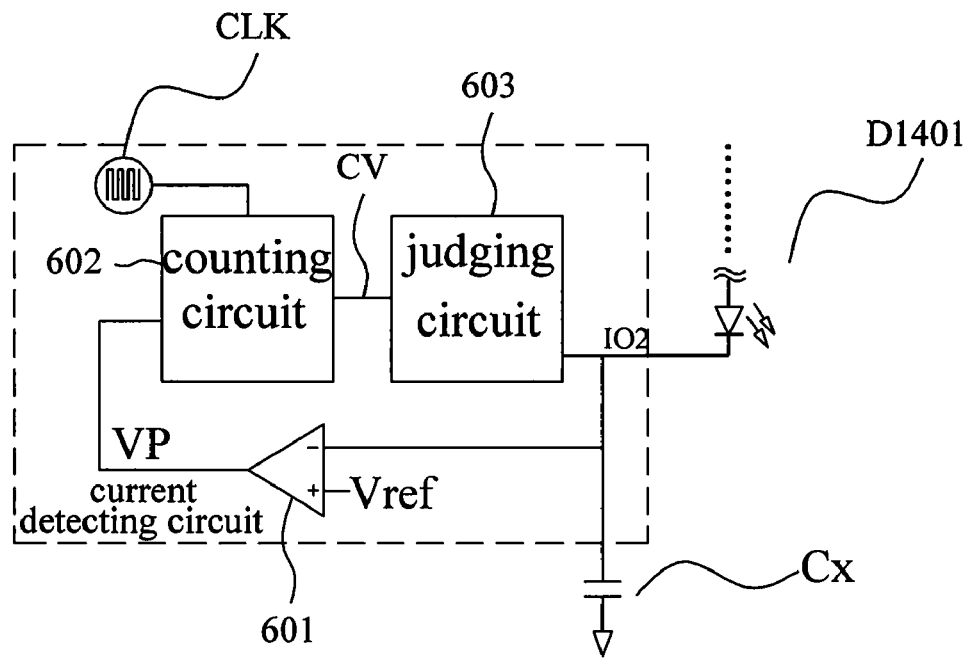
FIG. 17A and FIG. 17B respectively are the detail circuit block diagrams showing the current detecting circuit 1204~1205 on FIG. 12 according to an embodiment of the present invention.
Figure 17B:
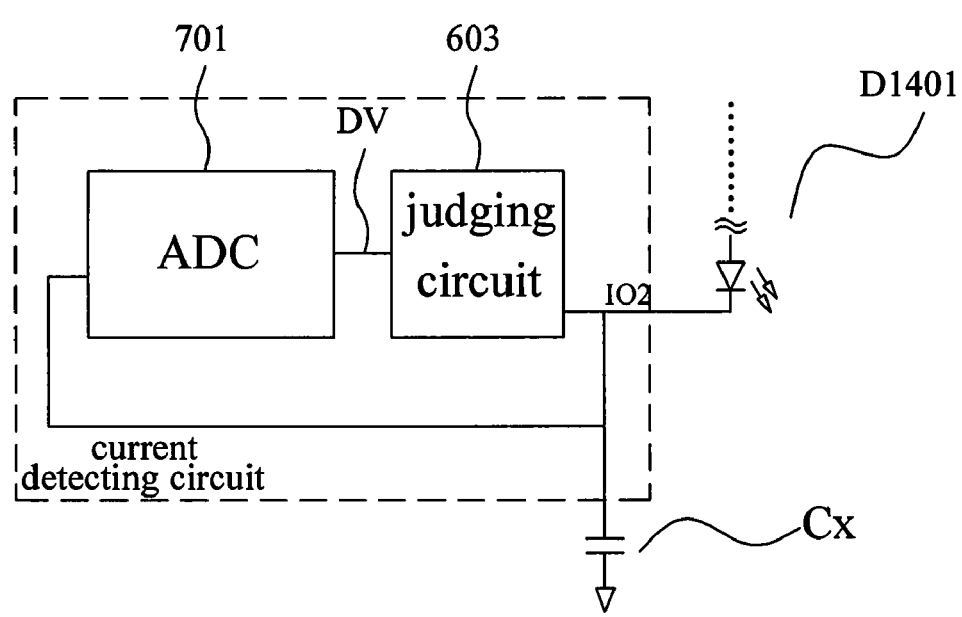

The circuits of the abovementioned embodiments depicted on FIG. 14 and FIG. 15 is the illustration of the detail circuit of the control circuits C1001~C1006, however, one of ordinary skill in the art should know that the circuit depicted on the FIG. 14 and FIG. 15 can be applied to the control circuit C1101 on FIG. 11 or the current detecting circuits 1204~1205 on FIG. 12. FIG. 17A and FIG. 17B respectively are the detail circuit block diagrams showing the current detecting circuit 1204~1205 on FIG. 12 according to an embodiment of the present invention. Referring to FIG. 17A and FIG. 17B, the operating principle of the two circuits is the same as that of the circuit on FIG. 14 and FIG. 15. The difference thereof is the judging circuit 1503 is used for determining the value of the reverse photoelectric current of the LED D1401 according to the counting value CV on FIG. 17A or the digital value DV on FIG. 17B. Since the principle of detection of the reverse photoelectric current of the LED D1401 is completely described, the detail description is omitted.

In summary, the spirit of the present invention is to utilize the LED matrix to be a display device and an input device. In other words, end user can directly input information through a laser pen or another light emitting element to the LED matrix. The major principle of the present invention is to apply the photoelectric effect, which make the reverse photoelectric current be generated when the LED receives light, for detecting the light source. Therefore, the present invention at least has the advantages of:

1. reducing the complication of data input;
2. freeing from additional optical sensing element;
3. being adapted for a novice and a child to use;
4. showing the result immediately after input; and
5. freeing from the computer as the medium interface.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. An information input panel using light emitted diode matrix, comprising:
    a light emitted diode matrix, comprising a plurality of light emitted diodes, wherein each light emitted diode comprises a first terminal and a second terminal; and
    a plurality of control circuits, wherein a first control terminal of each control circuit is coupled to the first terminal of the corresponding light emitted diode, and a second control terminal of each control circuit is coupled to the second terminal of the corresponding light emitted diode,
    wherein, in a detecting period, the control circuit detects the reverse photoelectric current of the corresponding coupled light emitted diode to determine whether the corresponding coupled light emitted diode is lighted up,
    wherein the first terminal of each light emitted diode is cathode, and the second terminal of each light emitted diode is anode, and in the detecting period, the second control terminal of the control circuits provides a common voltage and the first control terminal of the control circuit provides a power supply voltage for a preset period, and then the control circuit sets the first control terminal to a high impedance state, and each control circuit comprises:
        a comparator, comprising a first input terminal, a second input terminal and an output terminal, wherein the first input terminal thereof receives a preset voltage, a second input terminal thereof is coupled to the first control terminal of the control circuit, in the detecting period, a voltage of a comparing signal outputted from the output terminal of the comparator is changed from a first saturation voltage to a second saturation voltage when a voltage of the first control terminal of the control circuit is smaller than the preset voltage;
        a counting circuit, coupled to the output terminal of the comparator, wherein from the beginning of the detecting period, a counting value is accumulated for each preset time, wherein when the voltage of the comparing signal is changed from the first saturation voltage to the second saturation voltage, the accumulating is stopped and the accumulated counting value is outputted; and
        a judging circuit, coupled to the counting circuit for receiving the counting value, wherein the light emitted diode is lighted up when the counting value is smaller than a preset value.

2. An information input panel using light emitted diode matrix, comprising:
a light emitted diode matrix, comprising a plurality of light emitted diodes, wherein each light emitted diode comprises a first terminal and a second terminal; and
a plurality of control circuits, wherein a first control terminal of each control circuit is coupled to the first terminal of the corresponding light emitted diode, and a second control terminal of each control circuit is coupled to the second terminal of the corresponding light emitted diode,
wherein, in a detecting period, the control circuit detects the reverse photoelectric current of the corresponding coupled light emitted diode to determine whether the corresponding coupled light emitted diode is lighted up,
wherein the first terminal of each light emitted diode is anode, and the second terminal of each light emitted diode is cathode, and in the detecting period, the second control terminal of the control circuits provides a power supply voltage and the first control terminal of the control circuit provide a common voltage for a preset period, and then the control circuit sets the first control terminal to a high impedance state, and each control circuit comprises:
a comparator, comprising a first input terminal, a second input terminal and an output terminal, the first input terminal thereof receiving a preset voltage, the second input terminal thereof coupled to the first control terminal of the control circuit, wherein in the detecting period, a voltage of a comparing signal outputted from the output terminal of the comparator is changed from a first saturation voltage to a second saturation voltage when a voltage of the first control terminal of the control circuit is larger than the preset voltage;
a counting circuit, coupled to the output terminal of the comparator, wherein from the beginning of the detecting period, a counting value is accumulated for each preset time, wherein when the voltage of the comparing signal is changed from the first saturation voltage to the second saturation voltage, the accumulating is stopped and the accumulated counting value is outputted; and
a judging circuit, coupled to the counting circuit, for receiving the counting value, wherein the light emitted diode is lighted up when the counting value is smaller than a preset value.

3. An information input panel using light emitted diode matrix, comprising:
a light emitted diode matrix, comprising a plurality of light emitted diodes, wherein each light emitted diode comprises a first terminal and a second terminal; and
a plurality of control circuits, wherein a first control terminal of each control circuit is coupled to the first terminal of the corresponding light emitted diode, and a second control terminal of each control circuit is coupled to the second terminal of the corresponding light emitted diode,
wherein, in a detecting period, the control circuit detects the reverse photoelectric current of the corresponding coupled light emitted diode to determine whether the corresponding coupled light emitted diode is lighted up,
wherein the first terminal of each light emitted diode is cathode, and the second terminal of each light emitted diode is anode, and in the detecting period, the second control terminal of the control circuits provides a common voltage and the first control terminal of the control circuit provide a power supply voltage for a preset period, and then the control circuit sets the first control terminal thereof to a high impedance state, and each control circuit comprises:
an analog-to-digital converter, comprising an input terminal and an output terminal, the input terminal thereof coupled to the first control terminal of the control circuit, wherein before the end of the detecting period, a digital value is outputted according to the voltage of the first control terminal of the control circuit in a predetermined period; and
a judging circuit, coupled to the analog-to-digital converter, for receiving the digital value, wherein the light emitted diode coupled to the control circuit is lighted up when the digital value is smaller than a preset value.

4. An information input panel using light emitted diode matrix, comprising:
a light emitted diode matrix, comprising a plurality of light emitted diodes, wherein each light emitted diode comprises a first terminal and a second terminal; and
a plurality of control circuits, wherein a first control terminal of each control circuit is coupled to the first terminal of the corresponding light emitted diode, and a second control terminal of each control circuit is coupled to the second terminal of the corresponding light emitted diode,
wherein, in a detecting period, the control circuit detects the reverse photoelectric current of the corresponding coupled light emitted diode to determine whether the corresponding coupled light emitted diode is lighted up,
wherein the first terminal of each light emitted diode is anode, and the second terminal of each light emitted diode is cathode, and in the detecting period, the second control terminal of the control circuits provides a power supply voltage and the first control terminal of the control circuit provide a common voltage for a preset period, and then the control circuit sets the first control terminal thereof to a high impedance state, and each control circuit comprises:
an analog-to-digital converter, comprising an input terminal and an output terminal, the input terminal thereof coupled to the first control terminal of the control circuit, wherein before the end of the detecting period, a digital value is outputted according to a voltage of the first control terminal of the control circuit in a predetermined period; and
a judging circuit, coupled to the analog-to-digital converter, for receiving the digital value, wherein the light emitted diode coupled to the control circuit is lighted up when the digital value is larger than a preset value.

5. An information input panel using light emitted diode matrix, comprising:
a light emitted diode matrix, comprising N×M light emitted diodes, wherein each light emitted diode comprises a first terminal and a second terminal;
a control circuit, comprising N first control terminals and M second control terminals, the $i^{th}$ first control terminal thereof coupled to the first terminals of the light emitted diodes in the $i^{th}$ row, the $j^{th}$ second control terminal thereof coupled to the second terminals of the light emitted diodes in the $j^{th}$ column,
wherein in a $k^{th}$ detecting period, the control circuit utilizes each second control terminal to detect the reverse photoelectric currents flowing from the M light emitted diodes to a $k^{th}$ first control terminal to determine whether the corresponding light emitted diode in a $k^{th}$ row is lighted up, when a reverse photoelectric current of a specific light emitted diode in the $k^{th}$ row is larger than a predetermined value, the specific light emitted diode is lighted up, wherein "M", "N", "i", "j", "k", are nature number, and 0<i<=M, 0<j<=N, 0<k<=M, wherein each first terminal of the light emitted diodes is cathode, each second terminal of the light emitted diodes is anode, and the control circuit comprises:

a horizontal control circuit, comprising the N first control terminals;

a vertical control circuit, comprising the M second control terminals; and

M current detecting circuits, correspondingly coupled to the M second control terminals, wherein in the $k^{th}$ detecting period, the $k^{th}$ first control terminal of the horizontal control circuit is set to a power supply voltage, the M second control terminals of the vertical control circuit are set to a common voltage for a preset period and then M second control terminals of the vertical control circuit is set to a high impedance state, and the reverse photoelectric current of the $p^{th}$ light emitted diode in the $k^{th}$ row is determined by the $p^{th}$ current detecting circuit according to a variation of a terminal voltage of the $p^{th}$ second control terminal with respect to time, wherein in the $k^{th}$ lightened period, the $k^{th}$ first control terminal of the horizontal control circuit is set to the common voltage and the $p^{th}$ second control terminal of the vertical control circuit is set to the power supply voltage to light up the $p^{th}$ light emitted diode in the $k^{th}$ row while the reverse photoelectric current of the $p^{th}$ light emitted diode in the $k^{th}$ row is larger than the predetermined value, wherein "p" is nature number.

6. The information input panel according to claim 5, wherein the $p^{th}$ current detecting circuit comprises:

a comparator, comprising a first input terminal, a second input terminal and an output terminal, the first input terminal thereof receiving a preset voltage, the second input terminal thereof coupled to the second control terminal of the control circuit, wherein a voltage of a comparing signal outputted from the output terminal of the comparator is changed from a first saturation voltage to a second saturation voltage when a voltage of the second control terminal of the control circuit is larger than the preset voltage;

a counting circuit, coupled to the output terminal of the comparator, wherein from the beginning of the $k^{th}$ detecting period, a counting value is accumulated for each preset time, wherein when the voltage of the comparing signal is changed from the first saturation voltage to the second saturation voltage, the accumulating is stopped and the accumulated counting value is outputted; and a judging circuit, coupled to the counting circuit, for receiving the counting value to determine a value of the reverse photoelectric current.

7. The information input panel according to claim 5, wherein the $p^{th}$ current detecting circuit comprises:

an analog-to-digital converter, comprising an input terminal and an output terminal, the input terminal thereof coupled to the second control terminal of the control circuit, wherein before the end of the $k^{th}$ detecting period, a digital value is outputted according to a voltage of the second control terminal of the control circuit in a predetermined period; and a judging circuit, coupled to the analog-to-digital converter, for receiving the digital value to determine a value of the reverse photoelectric current.

8. An information input panel using light emitted diode matrix, comprising:

a light emitted diode matrix, comprising N×M light emitted diodes, wherein each light emitted diode comprises a first terminal and a second terminal;

a control circuit, comprising N first control terminals and M second control terminals, the $i^{th}$ first control terminal thereof coupled to the first terminals of the light emitted diodes in the $i^{th}$ row, the $j^{th}$ second control terminal thereof coupled to the second terminals of the light emitted diodes in the $j^{th}$ column, wherein in a $k^{th}$ detecting period, the control circuit utilizes each second control terminal to detect the reverse photoelectric currents flowing from the M light emitted diodes to a $k^{th}$ first control terminal to determine whether the corresponding light emitted diode in a $k^{th}$ row is lighted up, when a reverse photoelectric current of a specific light emitted diode in the $k^{th}$ row is larger than a predetermined value, the specific light emitted diode is lighted up, wherein "M", "N", "i", "j", "k", are nature number, and 0<i<=M, 0<j<N, 0<k<=M, wherein the first terminal of each light emitted diode is anode, the second terminal of each light emitted diode is cathode, and the control circuit comprises:

a horizontal control circuit, comprising the N first control terminals;

a vertical control circuit, comprising the M second control terminals; and

M current detecting circuits, correspondingly coupled to M second control terminals, Wherein in $k^{th}$ detecting period, the $k^{th}$ first control terminal of the horizontal control circuit is set to a common voltage, M second control terminals of the vertical control circuit are set to a power supply voltage for a preset period and then M second control terminals of the vertical control circuit is set to a high impedance state, and the reverse photoelectric current of the $p^{th}$ light emitted diode in the $k^{th}$ row is determined by the $p^{th}$ current detecting circuit according to a variation of a terminal voltage of the $p^{th}$ second control terminal with respect to time, wherein in the $k^{th}$ lightened period, the $k^{th}$ first control terminal of the horizontal control circuit is set to the power supply voltage and the $p^{th}$ second control terminal of the vertical control circuit is set to the common voltage to light up the $p^{th}$ light emitted diode in the $k^{th}$ row while the reverse photoelectric current of $p^{th}$ light emitted diode in the $k^{th}$ row is larger than the predetermined value, wherein "p" is nature number.

9. The information input panel according to claim 8, wherein the $p^{th}$ current detecting circuit comprises:

a comparator, comprising a first input terminal, a second input terminal and an output terminal, the first input terminal thereof receiving a preset voltage, the second input terminal thereof coupled to the second control terminal of the control circuit, wherein a voltage of a comparing signal outputted from the output terminal of the comparator is changed from a first saturation voltage to a second saturation voltage when a voltage of the second control terminal of the control circuit is smaller than the preset voltage;

a counting circuit, coupled to the output terminal of the comparator, wherein from the beginning of the $k^{th}$ detecting period, a counting value is accumulated for each preset time, wherein when the voltage of the comparing signal is changed from the first saturation voltage to the second saturation voltage, the accumulating is stopped and the accumulated counting value is outputted; and a judging circuit, coupled to the counting circuit, for receiving the counting value to determine a value of the reverse photoelectric current.

10. The information input panel according to claim 8, wherein the $p^{th}$ current detecting circuit comprises:

an analog-to-digital converter, comprising an input terminal and an output terminal, the input terminal thereof coupled to the second control terminal of the control circuit, wherein before the end of the $k^{th}$ detecting period, a digital value is outputted according to a voltage of the second control terminal of the control circuit in a predetermined time; and a judging circuit, coupled to the analog-to-digital converter, for receiving the digital value to determine a value of the reverse photoelectric current.

11. An information input panel using light emitted diode matrix, comprising:

a light emitted diode matrix, comprising a plurality of light emitted diodes, wherein each light emitted diode comprises a first terminal and a second terminal;

a first switching circuit, comprising a first terminal and a plurality of second terminals, the second terminals of the first switching circuit respectively coupled to the first terminals of the light emitted diodes;

a second switching circuit, comprising a first terminal and a plurality of second terminals, the second terminals of the second switching circuit respectively coupled to the second terminals of the light emitted diodes; and a control circuit, comprising a first control terminal and a second control terminal, the first control terminal thereof coupled to the first terminal of the first switching circuit, the second control terminal thereof coupled to the first terminal of the second switching circuit, wherein in an ith detecting period, the first terminal of the first switching circuit is electrically connected to the ith second terminal of the first switching circuit, and the first terminal of the second switching circuit is electrically connected to the ith second terminal of the second switching circuit, and then the control circuit detects the reverse photoelectric current of the coupled ith light emitted diode to determine whether the ith light emitted diode is lighted up, wherein "i" is a nature number, wherein the first terminal of each light emitted diode is cathode, the second terminal of each light emitted diode is anode, in each detecting period, the second control terminal of the control circuit provides a common voltage and the first control terminal of the control circuit provides a power supply voltage for a preset period, and then the control circuit sets the first control terminal of the control circuit to a high impedance state, and the control circuit comprises:

a comparator, comprising a first input terminal, a second input terminal and an output terminal, the first input terminal thereof receiving a preset voltage, the second input terminal thereof coupled to the first control terminal of the control circuit, wherein in each detecting period, a voltage of a comparing signal outputted from the output terminal of the comparator is changed from a first saturation voltage to a second saturation voltage when a voltage of the first control terminal of the control circuit is smaller than the preset voltage;

a counting circuit, coupled to the output terminal of the comparator, wherein from the beginning of each detecting period, a counting value is accumulated for each preset time, wherein when the voltage of the comparing signal is changed from the first saturation voltage to the second saturation voltage, the accumulating is stopped and the accumulated counting value is outputted; and a judging circuit, coupled to the counting circuit, for receiving the counting value, wherein the coupled light emitted diode is lighted up when the counting value is smaller than a preset value.

12. An information input panel using light emitted diode matrix, comprising:

a light emitted diode matrix, comprising a plurality of light emitted diodes, wherein each light emitted diode comprises a first terminal and a second terminal;

a first switching circuit, comprising a first terminal and a plurality of second terminals, the second terminals of the first switching circuit respectively coupled to the first terminals of the light emitted diodes;

a second switching circuit, comprising a first terminal and a plurality of second terminals, the second terminals of the second switching circuit respectively coupled to the second terminals of the light emitted diodes; and a control circuit, comprising a first control terminal and a second control terminal, the first control terminal thereof coupled to the first terminal of the first switching circuit, the second control terminal thereof coupled to the first terminal of the second switching circuit, wherein in an ith detecting period, the first terminal of the first switching circuit is electrically connected to the ith second terminal of the first switching circuit, and the first terminal of the second switching circuit is electrically connected to the ith second terminal of the second switching circuit, and then the control circuit detects the reverse photoelectric current of the coupled ith light emitted diode to determine whether the ith light emitted diode is lighted up, wherein "i" is a nature number, wherein the first terminal of each light emitted diode is anode, the second terminal of each light emitted diode is cathode, in each detecting period, the second control terminal of the control circuit provides a power supply voltage and the first control terminal of the control circuit provides a common voltage for a preset period, and then the control circuit sets the first control terminal of the control circuit to a high impedance state, and the control circuit comprises:

a comparator, comprising a first input terminal, a second input terminal and an output terminal, the first input terminal thereof receiving a preset voltage, the second input terminal thereof coupled to the first control terminal of the control circuit, wherein in each detecting period, a voltage of a comparing signal outputted from the output terminal of the comparator is changed from a first saturation voltage to a second saturation voltage when a voltage of the first control terminal of the control circuit is larger than the preset voltage;

a counting circuit, coupled to the output terminal of the comparator, wherein from the beginning of each detecting period, a counting value is accumulated for each preset time, when the voltage of the comparing signal is changed from the first saturation voltage to the second saturation voltage, the accumulating is stopped and the accumulated counting value is outputted; and a judging circuit, coupled to the counting circuit, for receiving the counting value, wherein the coupled light emitted diode is lighted up when the counting value is smaller than a preset value.

13. An information input panel using light emitted diode matrix, comprising:

a light emitted diode matrix, comprising a plurality of light emitted diodes, wherein each light emitted diode comprises a first terminal and a second terminal;

a first switching circuit, comprising a first terminal and a plurality of second terminals, the second terminals of the first switching circuit respectively coupled to the first terminals of the light emitted diodes;

a second switching circuit, comprising a first terminal and a plurality of second terminals, the second terminals of the second switching circuit respectively coupled to the second terminals of the light emitted diodes; and a control circuit, comprising a first control terminal and a second control terminal, the first control terminal thereof coupled to the first terminal of the first switching circuit, the second control terminal thereof coupled to the first terminal of the second switching circuit, wherein in an ith detecting period, the first terminal of the first switching circuit is electrically connected to the ith second terminal of the first switching circuit, and the first terminal of the second switching circuit is electrically connected to the ith second terminal of the second switching circuit, and then the control circuit detects the reverse photoelectric current of the coupled ith light emitted diode to determine whether the ith light emitted diode is lighted up, wherein "i" is a nature number, wherein the first terminal of each light emitted diode is cathode, the second terminal of each light emitted diode is anode, in each detecting period, the second control terminal of the control circuit provides a common voltage and the first control terminal of the control circuit provides a power supply voltage for a preset period, and then the control circuit sets the first control terminal of the control circuit to a high impedance state, and the control circuit comprises:

an analog-to-digital converter, comprising an input terminal and an output terminal, the input terminal thereof coupled to the first control terminal of the control circuit, before the end of each detecting period, a digital value is outputted according to a voltage of the first control terminal of the control circuit in a predetermined period; and a judging circuit, coupled to the analog-to-digital converter, for receiving the digital value, wherein the coupled light emitted diode is lighted up when the digital value is smaller than a preset value.

14. An information input panel using light emitted diode matrix, comprising:

a light emitted diode matrix, comprising a plurality of light emitted diodes, wherein each light emitted diode comprises a first terminal and a second terminal;

a first switching circuit, comprising a first terminal and a plurality of second terminals, the second terminals of the first switching circuit respectively coupled to the first terminals of the light emitted diodes;

a second switching circuit, comprising a first terminal and a plurality of second terminals, the second terminals of the second switching circuit respectively coupled to the second terminals of the light emitted diodes; and a control circuit, comprising a first control terminal and a second control terminal, the first control terminal thereof coupled to the first terminal of the first switching circuit, the second control terminal thereof coupled to the first terminal of the second switching circuit, wherein in an ith detecting period, the first terminal of the first switching circuit is electrically connected to the ith second terminal of the first switching circuit, and the first terminal of the second switching circuit is electrically connected to the ith second terminal of the second switching circuit, and then the control circuit detects the reverse photoelectric current of the coupled ith light emitted diode to determine whether the ith light emitted diode is lighted up, wherein "i" is a nature number, wherein the first terminal of each light emitted diode is anode, the second terminal of each light emitted diode is cathode, in each detecting period, the second control terminal of the control circuit provides a power supply voltage and the first control terminal of the control circuit provides a common voltage for a preset period, and then the control circuit sets the first control terminal of the control circuit to a high impedance state, and the control circuit comprises:

an analog-to-digital converter, comprising an input terminal and an output terminal, the input terminal thereof coupled to the first control terminal of the control circuit, before the end of each detecting period, a digital value is outputted according to a voltage of the first control terminal of the control circuit in a predetermined period; and a judging circuit, coupled to the analog-to-digital converter, for receiving the digital value, wherein the coupled light emitted diode is lighted up when the digital value is larger than a preset value.

* * * * *